April 10, 1928.
N. L. JARVIS ET AL
1,665,882
CASTER
Filed Feb. 8, 1926
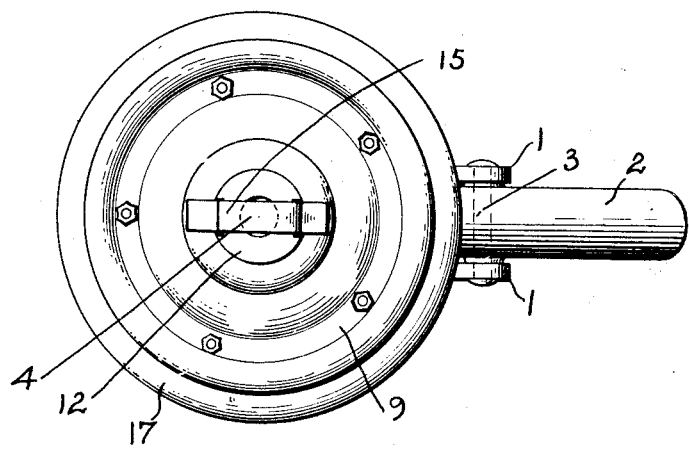
Fig.1.
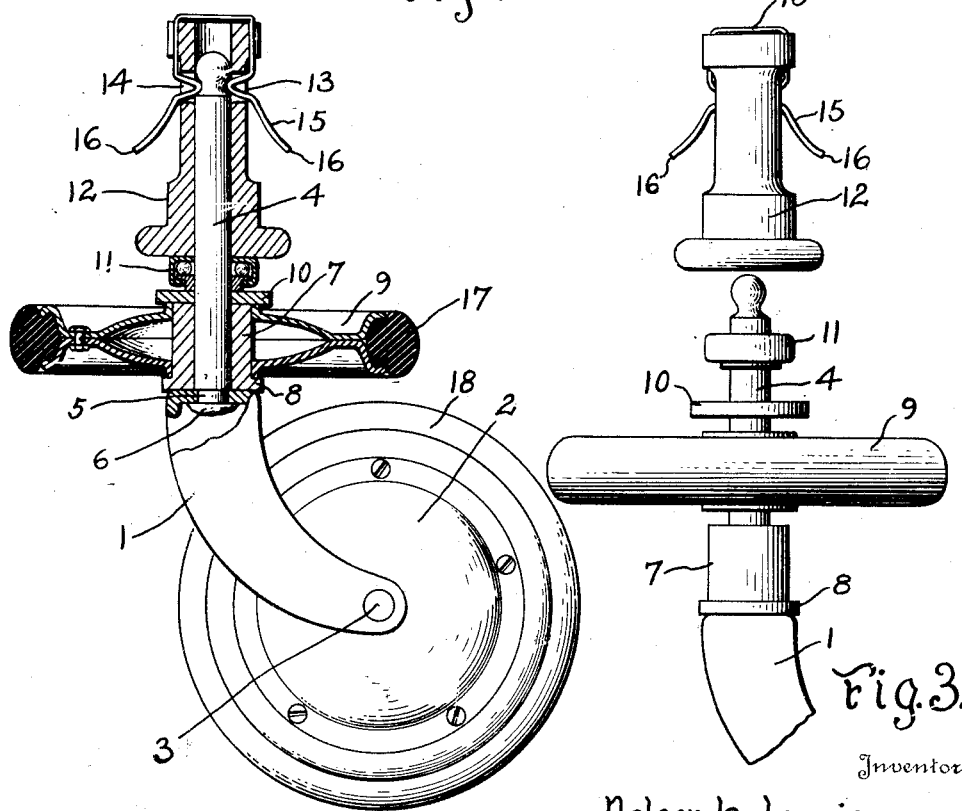
Fig.2.
Fig.3.
Inventor
Nelson L. Jarvis
Frank J. Jarvis
By Harry H. Styll
Attorney Patented Apr. 10, 1928.

1,665,882

UNITED STATES PATENT OFFICE.

NELSON L. JARVIS AND FRANK J. JARVIS, OF PALMER, MASSACHUSETTS, ASSIGNORS TO JARVIS & JARVIS, INC., OF PALMER, MASSACHUSETTS, A CORPORATION OF MASSACHUSETTS.

CASTER.

Application filed February 8, 1926. Serial No. 86,840.

This invention relates to roller casters and more particularly to a caster having a guard roller in addition to the regular roller.

The principal object of the invention is to provide simple and economical means whereby the caster may be used with or without the guard roller without affecting the operation of the caster stem in its bearings and its connections to the object to which it is attached.

Another object of the invention is to provide a simple, inexpensive bearing for the guard roller adapted for application to the caster stem.

Other objects and advantages of the invention will become apparent from the following description supplemented by the drawings, in which only the preferred form of the invention is shown and described by way of illustration. We, therefore, do not desire to be limited to this one form and arrangement of parts, as the invention contemplates changes within the scope of the claims and within the spirit of the invention as expressed in the claims.

Referring to the drawings in which similar characters denote similar parts throughout:

Figure 1 is a top plan view,

Figure 2 is an elevation partly in section, and

Figure 3 is a part elevation from the outside showing the members on the stem in separated position in order of their assembly.

In practice there are two general types of casters in use, the plain caster having the stem and a single roller which is the most common form, and a double caster having a guard roller mounted on the stem in a plane substantially at right angles to the first roller. The guard roller caster is used where it is found expedient to protect the walls and other articles in the room and is very commonly used on hospital beds and operating tables. These two types of casters are usually manufactured by the same manufacturer and prior to our invention it has been necessary to make two distinct casters for these purposes, making it necessary to carry a stock of each completely manufactured and to have a separate set of tools, dies and jigs for each of the types, which has added greatly to their cost of manufacture and has necessitated a large financial investment in the stocks carried. With our invention this expense and investment is reduced to a minimum, as either type of caster may be made from the same parts.

Referring to the drawings, the caster fork 1 is bifurcated and carries between the bifurcations the caster wheel 2 rotatably mounted on the roller pin or axle 3 secured in the fork 1. Rising from and secured to the fork 1 is the caster stem 4 having the reduced portion 5 riveted over at 6. On the caster stem 4 is the bearing portion 7 having the flange 8. This bearing portion 8 may either be a bushing slipped on the stem 4 or it may be made integral with the stem. The guard roller 9 is rotatably mounted on the bearing portion 7 resting on the flange 8. Over the roller 9 is a retaining bearing washer 10 adapted to hold the guard roller 9 in place on the bearing portion 7. Above the washer 10 is a ball bearing 11 which acts as a thrust bearing for the caster stem sleeve 12 rotatably mounted on the stem 4. The stem 4 has a groove 13 and the sleeve 12 has an opening 14 in line with the groove 13. A retaining spring 15 is bent around over the top of the sleeve 12 and through the openings 14 into the groove 13, having extending end portions 16 adapted to engage the sides of a socket in the article to which the caster is to be attached, not shown. This spring 15 holds the sleeve 12 on the stem 4, and also holds the sleeve 12 in the article to which the caster is secured. The nearer the ends 16 of the spring are pressed together, the firmer the sleeve 12 is held on the stem 4 by the indents of the spring.

The structure of the rollers 9 and 2 is the usual prior art structure of pressed metal rollers.

It is understood that the sleeve 12 is pushed into the socket of the article to which the caster is secured, the spring 15 retaining it therein. The stem 4 is free to rotate in the sleeve 12. The ball bearing 11 acts as a thrust bearing for the sleeve 12. The roller 9 is free to rotate on the bearing 7, being held between the washer 10 and the flange 8. The roller 9 is a guard roller and is designed to contact with the walls or other obstacle to prevent injury. It carries a rubber buffer tire 17. The roller 2 has a rubber tire 18 and contacts with the floor and carries the weight.

It will be noted that in assembling the roller 9 is first slipped on the stem 4, then the washer 10, the ball bearing 11, and sleeve 12 carrying the spring 15, the spring 15 locking all the parts in place on the stem 4.

It is clear also that the parts may be assembled without the roller 9 if a simple caster only is desired.

From the foregoing description it is clear that a simple, efficient and inexpensive device has been produced for carrying out the objects of the invention as herein described.

Having described our invention, we claim:

1. In a device of the character described, a roller bracket, a caster stem secured to the bracket, a bearing portion having a collar on the stem, a guard roller on the bearing portion resting on the collar, a ball bearing over the bearing portion, and a sleeve over the ball bearing rotatably mounted on the stem.

2. In a device of the character described, a roller bracket, a roller rotatably mounted thereon, a caster stem secured to the bracket, a bearing portion on the stem having an extending flange, a roller bearing on the stem over the bearing portion, and a rotatable sleeve on the stem abutting the roller bearing.

NELSON L. JARVIS.
FRANK J. JARVIS.